United States Patent
Nefcy et al.

(10) Patent No.: US 9,783,183 B2
(45) Date of Patent: Oct. 10, 2017

(54) BATTERY CHARGING STRATEGY IN A HYBRID VEHICLE

(71) Applicant: Ford Global Technologies, LLC, Dearborn, MI (US)

(72) Inventors: Bernard D. Nefcy, Novi, MI (US); Francis Thomas Connolly, Ann Arbor, MI (US); Mark Steven Yamazaki, Canton, MI (US); Christopher Alan Lear, Dearborn, MI (US); Wei Liang, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 81 days.

(21) Appl. No.: 14/628,884

(22) Filed: Feb. 23, 2015

(65) Prior Publication Data
US 2016/0244043 A1   Aug. 25, 2016

(51) Int. Cl.
*B60W 10/26* (2006.01)
*B60L 11/18* (2006.01)
(Continued)

(52) U.S. Cl.
CPC ............ *B60W 10/26* (2013.01); *B60K 6/387* (2013.01); *B60K 6/547* (2013.01);
(Continued)

(58) Field of Classification Search
None
See application file for complete search history.

(56) References Cited

U.S. PATENT DOCUMENTS 5,586,613 A * 12/1996 Ehsani ............... B60W 10/26
                                                180/65.23
6,164,400 A * 12/2000 Jankovic ............ B60W 10/06
                                                180/65.25
(Continued)

FOREIGN PATENT DOCUMENTS

KR      20030018878 A  *  3/2003   ......... Y02T 10/7005

OTHER PUBLICATIONS

Song, Machine Translation of KR 2003-0018878, Mar. 6, 2003, machine translation from espacenet.com.*

*Primary Examiner* — John R Olszewski
*Assistant Examiner* — David Merlino
(74) *Attorney, Agent, or Firm* — David B. Kelley; Brooks Kushman P.C.

(57) ABSTRACT

A vehicle includes an engine, a motor selectively coupled to the engine, a transmission selectively coupled to the motor, and a controller. The motor is able to operate as a motor (to provide torque to the transmission) and a generator (to charge a battery). In one mode, the controller can command the engine to both propel the vehicle and provide torque to the motor to charge the battery. The controller estimates the maximum available engine torque in the current gear and maintains the vehicle in the current gear of the transmission. And, the controller commands the motor to charge the battery by a magnitude based on the difference between driver demanded torque and an estimated maximum available engine torque in a current gear of the transmission. This allows the engine to operate at (or near) its maximum torque output to fulfill driver demands and charge the battery while inhibiting downshifting.

13 Claims, 3 Drawing Sheets

(51) Int. Cl.
  *B60W 10/08* (2006.01)
  *B60K 6/387* (2007.10)
  *B60K 6/547* (2007.10)
  *B60W 10/06* (2006.01)
  *B60W 10/115* (2012.01)
  *B60W 20/30* (2016.01)
  *B60W 20/13* (2016.01)
  *B60K 6/48* (2007.10)

(52) U.S. Cl.
  CPC .......... *B60L 11/1809* (2013.01); *B60W 10/06* (2013.01); *B60W 10/08* (2013.01); *B60W 10/115* (2013.01); *B60W 20/13* (2016.01); *B60W 20/30* (2013.01); *B60K 2006/4825* (2013.01); *B60W 2510/0657* (2013.01); *B60W 2510/1005* (2013.01); *B60W 2510/244* (2013.01); *B60W 2520/10* (2013.01); *B60W 2540/10* (2013.01); *B60W 2710/0666* (2013.01); *B60W 2710/1005* (2013.01); *B60W 2710/244* (2013.01); *B60W 2710/248* (2013.01); *Y02T 10/6252* (2013.01); *Y02T 10/6286* (2013.01); *Y10S 903/93* (2013.01)

(56) References Cited

U.S. PATENT DOCUMENTS

| | | | |
|---|---|---|---|
| 6,553,301 B1 * | 4/2003 | Chhaya | B60W 10/06 701/54 |
| 6,554,088 B2 * | 4/2003 | Severinsky | B60W 10/26 180/65.23 |
| 6,603,215 B2 | 8/2003 | Kuang et al. | |
| 7,228,926 B2 | 6/2007 | Takami et al. | |
| 7,771,310 B2 | 8/2010 | Tanishima | |
| 2002/0011792 A1 * | 1/2002 | Taniguchi | B60W 10/06 315/76 |
| 2011/0172862 A1 * | 7/2011 | Ortmann | B60W 10/06 701/22 |
| 2013/0158756 A1 * | 6/2013 | Yamazaki | B60W 20/19 701/22 |
| 2013/0297162 A1 | 11/2013 | Dai et al. | |
| 2015/0006001 A1 * | 1/2015 | Kawata | B60W 10/06 701/22 |
| 2015/0066333 A1 * | 3/2015 | Butcher | F02D 29/02 701/102 |
| 2016/0075322 A1 * | 3/2016 | Saito | B60W 10/26 701/22 |

\* cited by examiner

BATTERY CHARGING STRATEGY IN A HYBRID VEHICLE

TECHNICAL FIELD

The present disclosure relates to a control strategy for charging a battery in a hybrid vehicle.

BACKGROUND

Hybrid electric vehicles include both an engine and at least one electric motor to provide drive torque to the wheels. There are various types of hybrid electric vehicles. For example, "parallel" hybrid vehicles typically include clutches that selectively enable either or both the engine and the motor to provide drive torque. A "series" hybrid vehicle typically includes an electric motor that is always driveably connected to the road wheels, and an engine that is not mechanically connected to the wheels. In other words, the engine does not provide any of the torque required to propel the vehicle. Rather, in a "series" hybrid vehicle, the engine powers a generator to produce electrical energy that is stored in the battery and/or used by the motor.

The engine of hybrid vehicles can operate to provide drive torque while also charging a battery. To do so, an electric machine, such as an electric motor/generator, can convert output torque of the engine into electric energy to be stored in the battery for later propulsion of the electric machine. If the engine is operating to both propel the vehicle and charge the battery simultaneously, it must have available torque sufficient to do both. In certain situations, the vehicle may have to downshift to allow the engine to produce sufficient drive torque while also charging the battery at a sufficient rate. This can lead to shift busyness with frequent downshifting and upshifting.

SUMMARY

According to one embodiment, a vehicle comprises a battery, an electric machine, and at least one controller. The electric machine is selectively coupled to a transmission to selectively provide drive torque. The at least one controller is programmed to command a current from the electric machine to charge the battery at a magnitude that is based on a difference between driver demanded torque and an estimated maximum available engine torque in a current gear of the transmission. The controller can command the engine to output torque at or near its maximum torque output capabilities, with a portion of the total torque fulfilling driver torque demands, and the remainder of the torque capabilities turning the electric machine to charge the battery. The controller can estimate the maximum available torque output of the engine based on the current gear selected, and will charge the battery based on that amount, minus the torque necessary for propulsion.

In another embodiment, a control system in a vehicle includes an engine having a maximum available torque based on a current gear of a transmission. The control system comprises at least one controller programmed to command a current from an electric machine to charge a battery at a magnitude that is based on a difference between a driver demanded torque and a maximum available engine torque in the current gear to inhibit downshifting caused by charging.

In yet another embodiment, a method for inhibiting transmission shift busyness is provided in a vehicle having an electric machine selectively coupled to an engine and configured to provide electrical energy to a battery. A transmission is operated in one of a plurality of gears. Electrical energy is transmitted from the electric machine to the battery to charge the battery based on a difference between a driver demanded torque and maximum engine torque available in the one gear of the plurality of gears.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
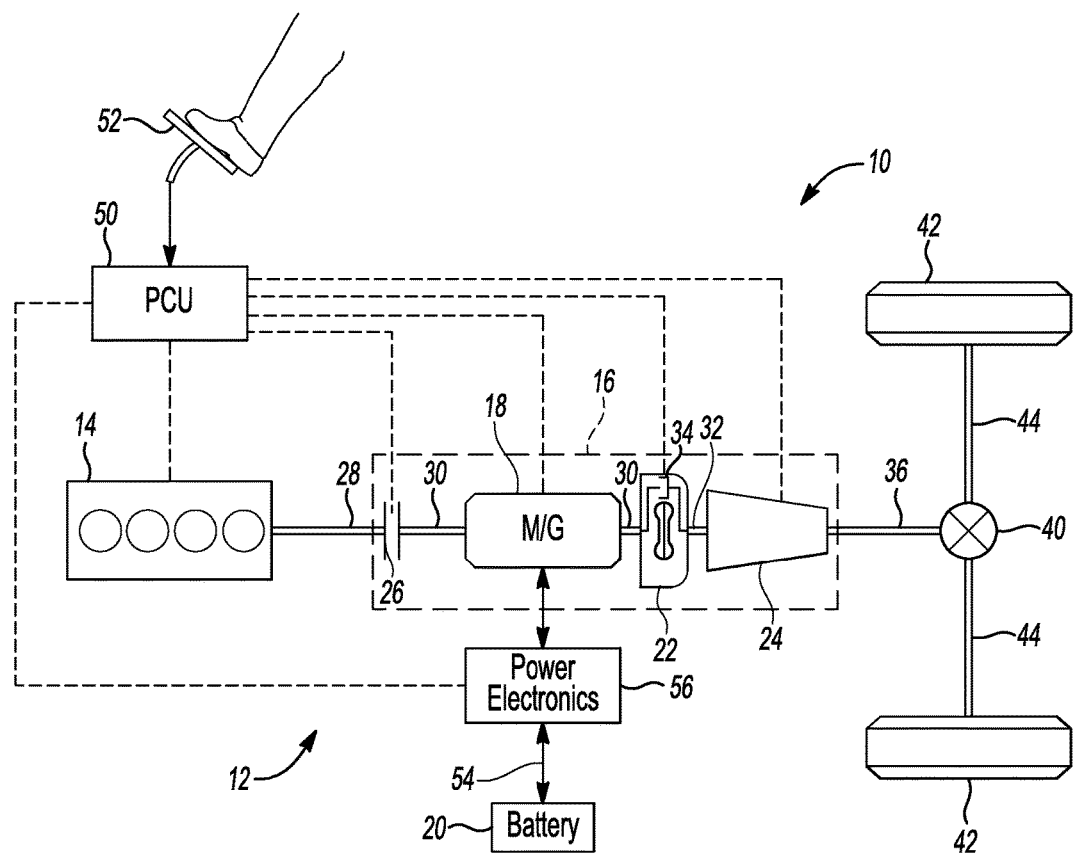
FIG. 1 is a schematic of a hybrid vehicle according to one embodiment of the present disclosure.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). The gearbox 24 then provides powertrain output torque to output shaft 36.

In one embodiment, the shift schedule can have shift points (i.e., points at which a shift is commanded) based on both driver demand and the rotational speed of the transmission input shaft 32. Having such a shift schedule generally drives the torque producing device (i.e., the engine 14 and/or M/G 18) to a torque-speed operating point of best efficiency or power, depending on the situation.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. In other words, references to "a controller" can refer to one or more controllers configured to control separate systems in the vehicle. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

As explained above, the controller 50 is programmed to charge the battery 20. This can be done in various fashions. In a regenerative braking mode, the M/G 18 converts rotational movement and momentum of the wheels 42 into an electric charge sent to and stored in the battery.

In another battery charging mode, referred to as an "engine-charging mode," the engine 14 is on and actively providing drive torque through the M/G 18, through the transmission gearbox 24 and to the wheels 42. In the engine-charging mode, the controller 50 commands the M/G 18 to convert a portion of the engine torque into electric energy to be stored in the battery 20. In other words, the M/G 18 can be operated as a generator to generate electric energy from the engine 14 while the engine is propelling the vehicle. In the engine-charging mode, the M/G 18 is providing negative torque by a magnitude that is less than the positive drive torque provided by the engine 14. This type of battery charging may be useful in situations in which the state of charge (SOC) of the battery 20 is relatively low and an immediate charge of the battery is desirable.

A maximum torque output of the engine 14 depends on many factors, one of which is the current gear of the transmission gearbox 24. When the SOC of the battery 20 is relatively low during the engine-charging mode, the controller 50 may request a charging load that requires more power than is available in the current gear of the transmission. To accommodate for the negative torque converted into electrical energy by the M/G 18, the controller 50 might normally request the transmission gearbox 24 to downshift to raise the rotational speed of the engine 14 to satisfy both the charging demands and the demanded driver torque. However, this reduces engine efficiency and can lead to unwanted downshifts and transmission shift busyness.

Therefore, according to multiple embodiments of the present disclosure, a control strategy is provided to more efficiently charge the battery without causing unwanted shift busyness. To reduce unwanted downshifts, the controller 50 may be programmed to command an amount of negative torque (charging) that exceeds the driver demanded torque but will not cause the transmission gearbox 24 to downshift to accommodate for the charging. In other words, during engine-charging mode, a request can be made to charge the battery 20 from the engine 14 by an amount in addition to the driver demand that will not exceed the engine power in the current gear of the transmission gearbox 24. This can be accomplished by estimating the remaining driver demand reserve (difference between driver demand and available engine power in the current gear) that can be used for charging. As the demand rises or falls in the current gear, the charging would make up the difference up to the shift point.

Figure 2:
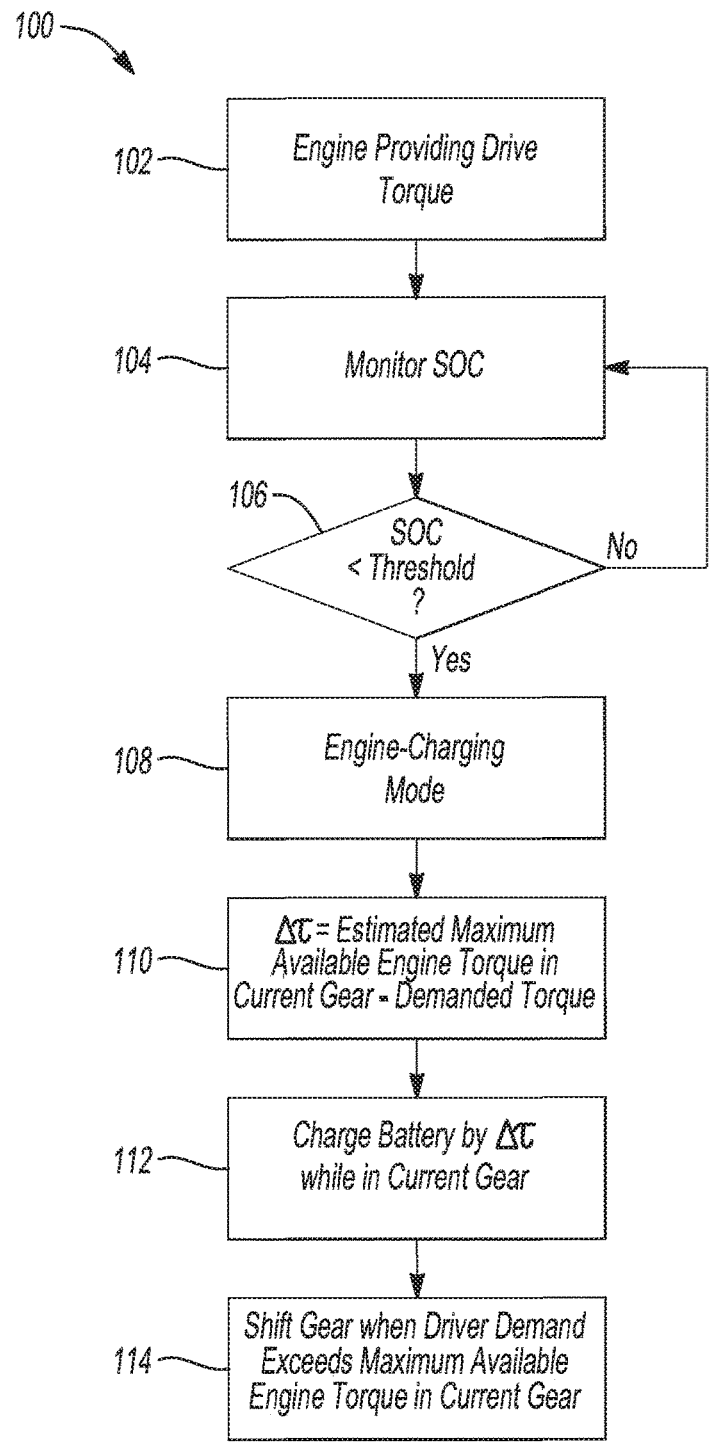
FIG. 2 is a flow chart exemplifying one embodiment of an algorithm programmed to be executed by a processor to charge a battery of the hybrid vehicle while reducing transmission shift busyness.

FIG. 2 illustrates an exemplary algorithm 100 implemented by the controller 50 to charge the battery 20 while inhibiting unwanted downshifting. At 102, the engine 14 is providing drive torque to propel the vehicle. The M/G 18 may or may not be actively assisting the engine 14 in propelling the vehicle. While the vehicle is traveling, the controller continuously monitors the SOC of the battery 20 at 104. When the SOC of the battery 20 is determined to be below a threshold charge at 106, the controller 50 causes the vehicle to enter the engine-charging mode at 108. In the engine-charging mode, as explained above, torque from the engine 14 is converted by the M/G 18 into electric energy to increase the SOC. In one example, the threshold is 30% of maximum SOC, however this threshold can be programmed to any amount in which charging of the battery is desirable while the engine 14 is providing drive torque.

Once a determination is made to enter the engine-charging mode, the controller 50 determines exactly how much to charge the battery 20. As further illustrated in FIGS. 3B-3C and explained below, the magnitude by which to charge the battery can be represented by $\Delta\tau$, which is the difference between driver demanded torque and an estimated maximum available engine torque while the transmission is in the current gear. The driver demanded torque is a function of the accelerator pedal position. The maximum available engine torque in the current gear is estimated by the engine management system, engine control module, or engine controller, such as the controller(s) described above. This can include maximum achievable crankshaft torque at the current (or specified) engine speed and current ambient operating conditions (such as ambient pressure, ambient temperature, engine temperature, etc.). This max torque computation also includes "real-time" adjustments for fuel enrichment and spark retard (to compensate for borderline knock limitation due to fuel octane). The controller(s) can compute this value from look-up tables that are generated during the engine mapping process. The maximum engine torque in the current gear can also be defined as the maximum allowable engine torque for best (or acceptable) efficiency, utilizing the engine torque map.

At 110, $\Delta\tau$ is the difference between these two amounts, representing how much torque can be split from the engine 14 and sent to the M/G 18 for charging without necessitating a downshift of the transmission.

As indicated at 112, the battery 20 will continue to be charged by an amount based on the magnitude of $\Delta\tau$ until the SOC has reached a second threshold, or until a gear shift event occurs. At 114, such a gear shift occurs. The controller 50 will cause the transmission gearbox 24 to shift gears based on, for example, the driver demand exceeding the maximum available engine torque in the current gear. In other words, when the maximum available engine torque exceeds that of the driver demand, and charging of the battery 20 in the current gear would sacrifice driving torque expectations, the transmission can shift gears. For example, the transmission gearbox 24 can downshift, thereby increasing the engine speed and enabling a better environment for the driving torque to be met while also charging the battery 20.

Figure 3A:
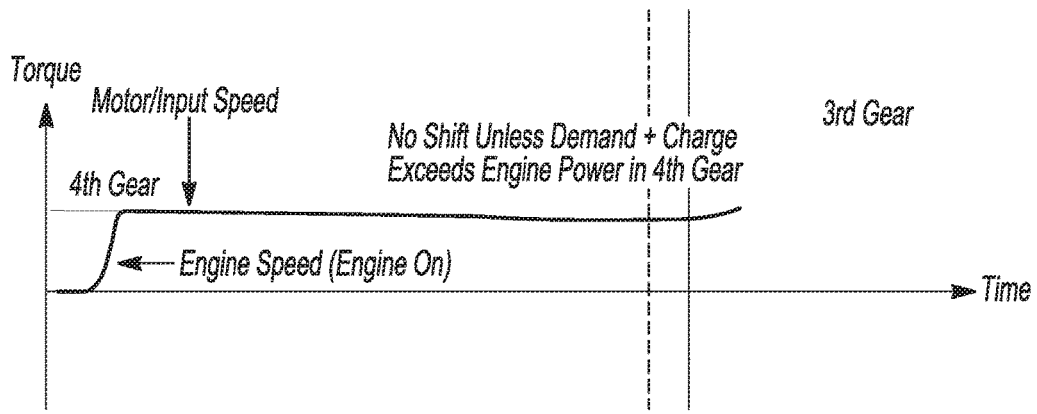
FIG. 3A is a plot of motor speed and engine speed before, during, and after a gear change in a transmission of the hybrid vehicle, according to one embodiment.
Figure 3B:
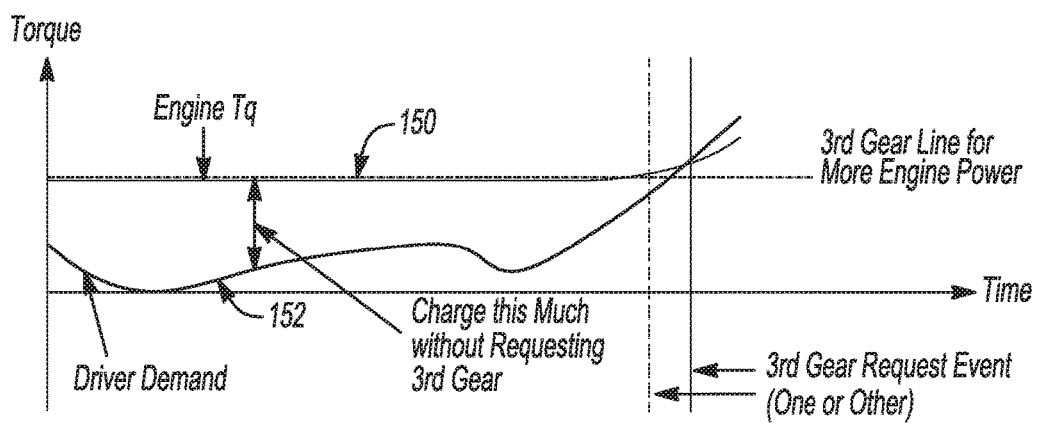
FIG. 3B is a plot of actual engine torque, available engine torque without causing a downshift, driver demand, and a magnitude of battery charge.
Figure 3C:
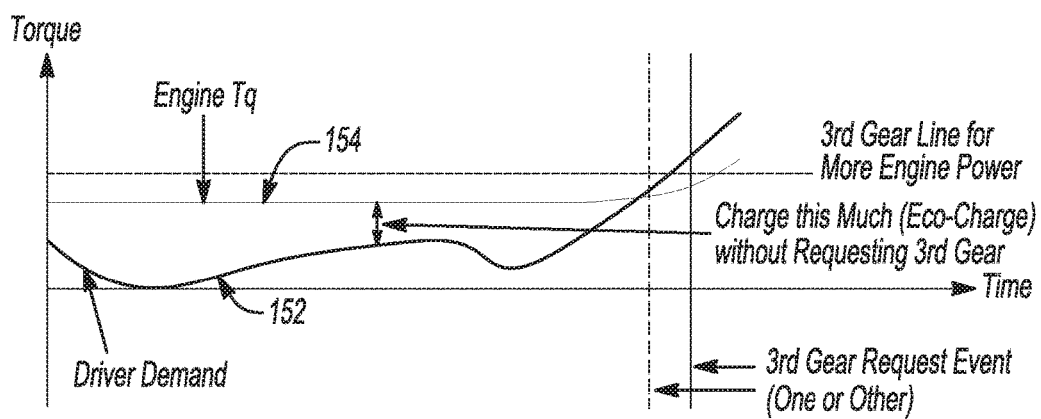
FIG. 3C is another plot of engine torque, available engine torque without causing a downshift, driver demand, and a slightly reduced magnitude of battery charge.

FIGS. 3A-3C illustrate a relationship between the speed of the M/G 18 (i.e., the transmission input speed) and the charging strategy based on maximum engine torque and driver demands. As shown in FIG. 3A, the transmission gearbox 24 is in $4^{th}$ gear and the engine 14 is initially off Based on, for example, the SOC of the battery 20 and/or the torque demands, it is determined to be desirable to activate the engine 14 to fulfill driver demands. This is done by closing the disconnect clutch 26, as explained above with reference to FIG. 1. Once the engine 14 is activated, the speeds of the engine 14, the M/G 18, and the transmission input are aligned. During the charging control strategy, the engine and M/G speed can remain relatively constant, as indicated in FIG. 3A, while variation is present in the distribution of the torque in the powertrain. Once a gear shift event occurs from $4^{th}$ gear to $3^{rd}$ gear, the speed of the engine 14 and M/G 18 increase.

FIG. 3B illustrates the amount of charging of the battery 20 based on $\Delta\tau$. The difference, $\Delta\tau$, between maximum available engine torque in $4^{th}$ gear (represented by line 150) and the driver demanded torque (represented by line 152) changes as the driver demand changes. The actual torque output of the engine 14 can be maintained at or slightly below the maximum available engine torque throughout charging of the battery 20 while in $4^{th}$ gear. This allows the maximum amount of battery charging while meeting driver torque demands. Such a strategy is thus favorable when the SOC is below a threshold, for example.

Once the driver torque demands exceed the maximum torque available of the engine 14, the controller 50 commands a gear shift in the transmission gearbox 24. This allows the engine speed to increase, providing the capability for the M/G 18 to charge the battery 20 while the torque demands are still met. Once in $3^{rd}$ gear, the algorithm can restart, with a new maximum available engine torque in a new gear.

FIG. 3C represents another embodiment of operation that leads to a plotted result similar to that of FIG. 3B. FIG. 3C illustrates the control strategy explained above implemented to charge the battery more efficiently. This charging mode can be implemented when it is more desirable to charge the battery 20 more efficiently rather than charge the battery by the difference between maximum available engine torque in the current gear and the driver demanded torque. In such a mode, the controller 50 can estimate an amount of remaining demand reserve, less than the maximum engine torque in the current gear, that can be used for charging the battery 20. In other words, instead of charging the battery 20 by $\Delta\tau$ explained above, the controller 50 can charge the battery by a magnitude based on the difference between (i) a magnitude of torque less than the maximum engine torque in the current gear, represented by line 154, and (ii) the driver demanded torque, again represented by line 152. In other words, the line 154 can be a controlled amount to be less than the line 150. The gear schedule can be modified to downshift when the reduced magnitude of torque less than the maximum engine torque (line 154) exceeds the driver demanded torque (line 152), Downshifting might therefore occur sooner when the more efficient battery charging system is active, as is the case in FIG. 3C.

It should be understood that references to "torque" can be interchanged with "power," and vice versa, because of the known relationship (i.e., power=torque×speed). Any description or limitations to a "torque" are not limited to only evaluating the torque; by mathematical relationships, the same evaluation can be made of power. For example, the battery can be charged by a power magnitude that is the difference between the available engine power and the driver demanded power.

References above to $\Delta\tau$ teach that the battery is charged by an amount corresponding to the difference between driver demanded torque and an estimated maximum available engine torque while the transmission is operating in the current gear. Of course, the engine can be operated to output torque below the actual maximum torque output of the engine. To inhibit the necessity of downshifting to properly charge the battery, the engine can be operated to output torque by an amount at or slightly below a magnitude that would otherwise normally signal a need for a downshift. Therefore, $\Delta\tau$ can be interpreted as the difference between (i) an engine torque output that would otherwise indicate a need for a downshift, and (ii) the driver demand. In other words, the "maximum available engine torque in the current gear" can be interpreted to include the maximum torque that the engine can output without necessitating a downshift.

It should be understood that the present disclosure enables the engine to operate at (or near) its maximum torque output while fulfilling driver demand and charging the battery without downshifting. For example, the engine can operate at its maximum torque output, or within 1, 5 or 10 Nm from its maximum torque output. The engine can remain in this range of output until either the driver demand increases above the maximum available engine torque or the battery is sufficiently charged.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle comprising:
a battery;
an electric machine selectively coupled to a transmission to selectively provide drive torque; and
a controller programmed to command a current from the electric machine to charge the battery at a magnitude that is based on a difference between driver demanded torque and an estimated maximum available engine torque in a current gear of the transmission while inhibiting downshifting of the transmission, and downshift the transmission in response to the driver demanded torque exceeding the maximum available engine torque in the current gear.

2. The vehicle of claim 1, wherein the controller is further programmed to command the current to charge the battery in response to a state of charge of the battery being less than a charge threshold.

3. The vehicle of claim 1, wherein the controller is further programmed to alter a shift schedule of the transmission based on a state of charge of the battery.

4. The vehicle of claim 1, wherein the controller is further programmed to command the engine to output torque by an amount exceeding the driver demanded torque and to command the electric machine to convert at least a portion of the torque into electrical energy to be stored in the battery.

5. The vehicle of claim 1, wherein the electric machine is electrically coupled to the battery and selectively coupled to an engine via a clutch, such that the electric machine can operate as a motor to provide drive torque and a generator to generate electrical energy for the battery.

6. A control system in a vehicle including an engine having a maximum available torque based on a current gear of a transmission, the control system comprising:
   at least one controller programmed to command a current from an electric machine to charge a battery at a magnitude that is based on a difference between a driver demanded torque and a maximum available engine torque in the current gear to inhibit downshifting caused by charging, and downshift the transmission in response to the driver demanded torque exceeding the maximum available engine torque in the current gear.

7. The control system of claim 6, wherein the controller is further programmed to command the current to charge the battery in response to a state of charge of the battery being less than a charge threshold.

8. The control system of claim 6, wherein the controller is further programmed to alter a shift schedule of the transmission based on a state of charge of the battery.

9. The control system of claim 6, wherein the controller is further programmed to command the engine to output engine torque by an amount exceeding the driver demanded torque and command the electric machine to convert at least a portion of the engine torque into electrical energy to be stored in the battery.

10. A method for controlling a vehicle having an electric machine selectively coupled to an engine, comprising:
    operating a transmission in a gear;
    transmitting electrical energy from the electric machine to a battery to charge the battery based on a difference between driver demanded torque and maximum engine torque available while the transmission is maintained in the gear; and
    downshifting the transmission in response to the driver demanded torque exceeding the maximum engine torque available.

11. The method of claim 10, further comprising transmitting the electrical energy in response to a state of charge of the battery being less than a charge threshold.

12. The method of claim 10, further comprising altering a shift schedule of the transmission based on a state of charge of the battery.

13. The method of claim 10, further comprising outputting engine torque by an amount exceeding the driver demanded torque, and operating the electric machine to convert at least a portion of the engine torque into electrical energy to be stored in the battery.

* * * * *